Patented Jan. 4, 1927.

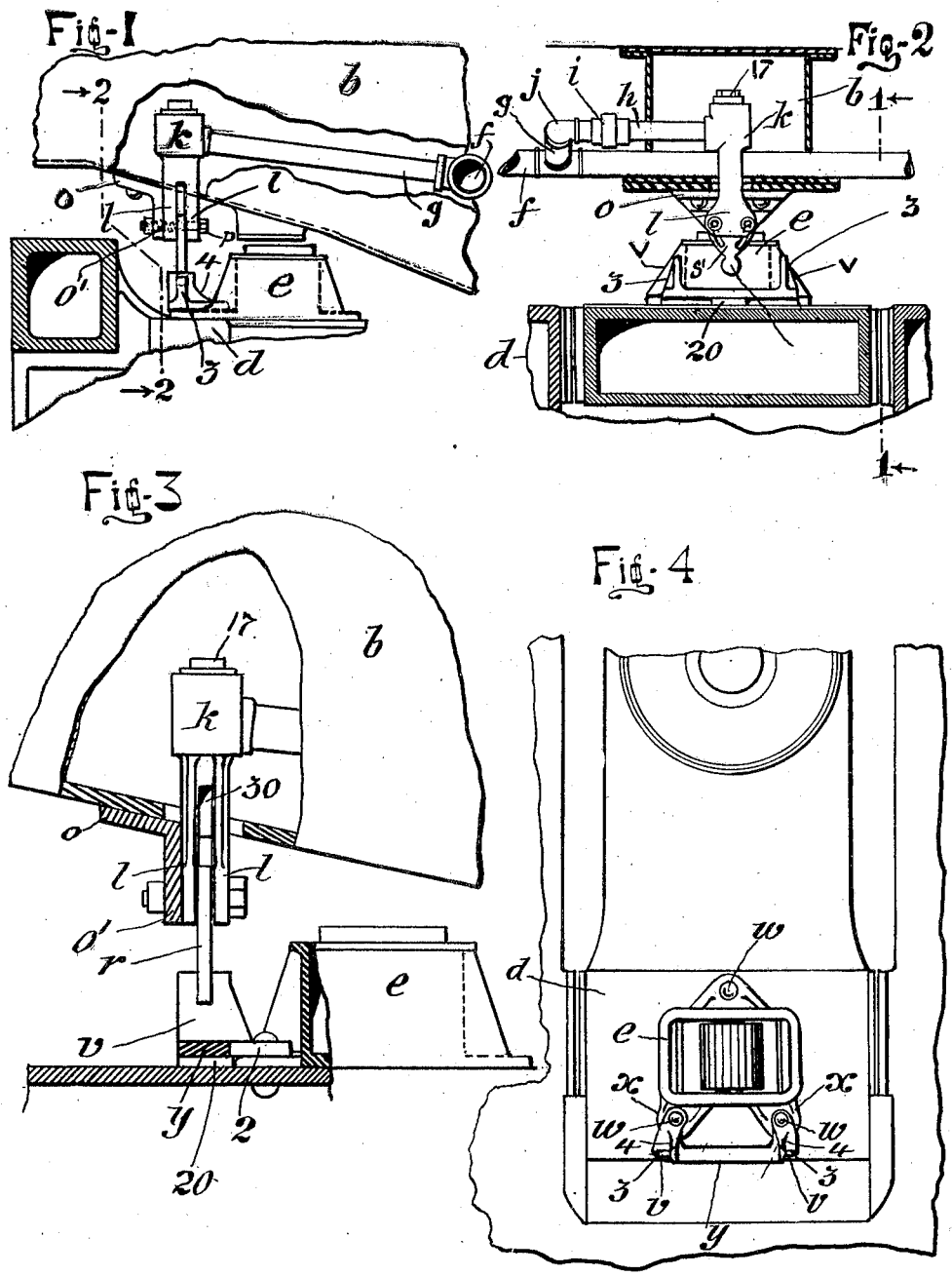

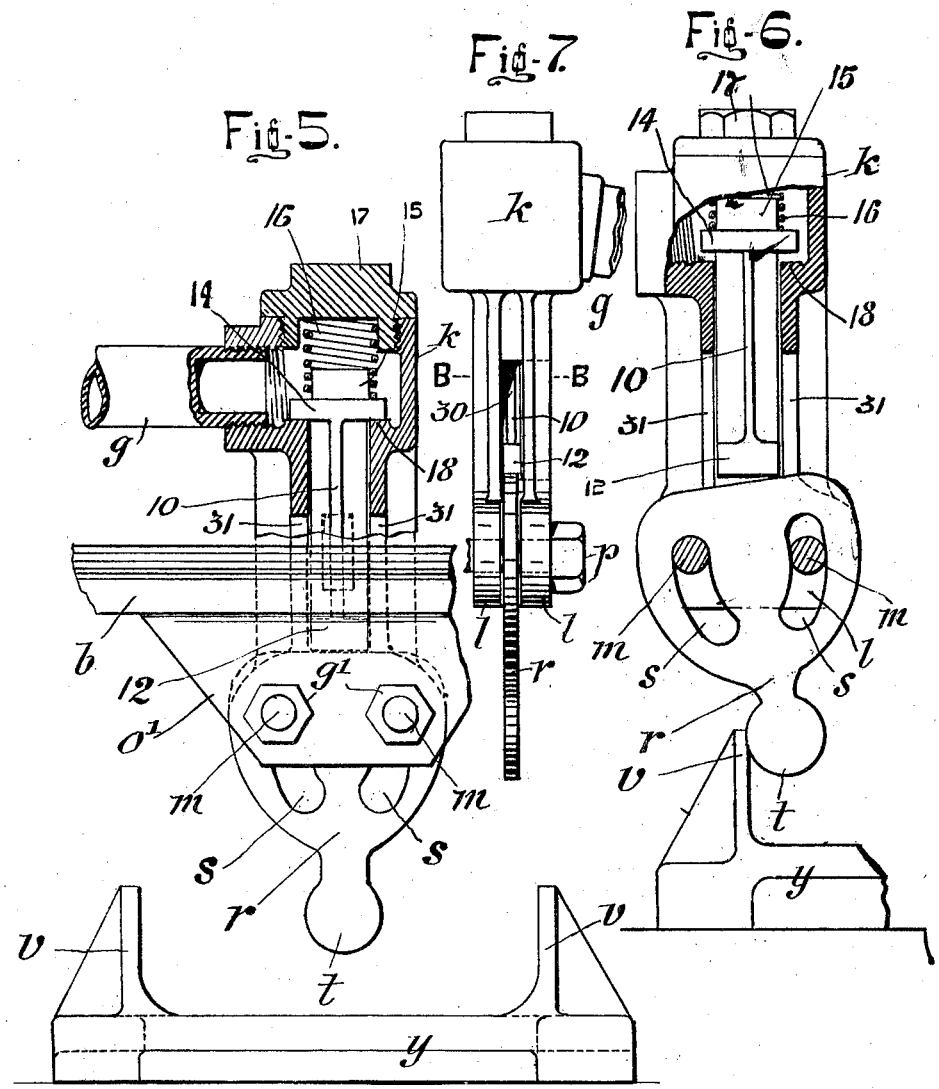

1,613,252

UNITED STATES PATENT OFFICE.

EMILE J. M. ST. JACQUES, OF MONTREAL, QUEBEC, CANADA, ASSIGNOR, BY DIRECT AND MESNE ASSIGNMENTS, TO OSCAR SURPRENENT, OF SCHENECTADY, NEW YORK, HIMSELF, AND JOHN T. DURKIN, OF SCHENECTADY, NEW YORK.

DERAILMENT BRAKE.

Application filed June 7, 1926, Serial No. 114,349, and in Canada May 10, 1926.

Heretofore many equipments have been suggested for railway cars to cause the brakes to be applied immediately one of the trucks of a train leaves the rail and my invention has for its object to produce a simple and solidly mounted equipment which will be as reliable as any part of the truck and in the event of derailment will without fail automatically cause the brake to be applied to the train.

To this end my invention consists in furnishing the air train-line pipe with a valve the body of which is supported by the air train line pipe directly over the side bearings which carry solidly constructed lugs adapted to be engaged by a lever for operating the air valve. The lever and the lugs are solidly constructed and so mounted that the valve lever will be engaged and moved by either one of the lugs in the event of abnormal displacement of the car body and truck and consequently the bearing members of the side bearings relatively to each other, as will occur upon derailment of one or more of the truck wheels. The brakes of the train will thus be instantaneously applied and damages due to the derailment will be reduced to a minimum.

For full comprehension, however, of my invention reference must be had to the accompanying drawings in which similar reference characters indicate the same parts and wherein:

Figure 1 is a front elevation of my improved derailment equipment as it appears mounted on a standard truck which is illustrated in vertical sectional view, the section being taken on line 1—1 Figure 2;

Figure 2 is a side elevation of my improved equipment similarly mounted, the truck being illustrated in vertical sectional view, and the section being taken on line 2—2 Figure 1;

Figure 3 is a similar view to Figure 1 drawn to a larger scale and illustrating particularly the rigid mounting of my equipment, the body bolster being broken away for purpose of illustration;

Figure 4 is a plan view of my improved equipment also similarly mounted, the part of the truck on which it is mounted being also shown in plan view;

Figures 5 and 6 are detail sectional views of the valve body illustrating particularly the direct operation of the valve, Figure 5 showing the normal position of the parts with the valve closed and Figure 6 illustrating the position of the parts including the valve when derailment has taken place and the brakes are applied;

Figure 7 is an elevation taken at right angles to Figure 6; and

Figure 8 is a horizontal sectional view taken on line B—B Figure 7.

The truck in connection with which I have illustrated my invention is one of the many in use by the railroads and the use of my invention is not restricted to the particular type of the truck shown.

In the drawings the substructure of a car is represented by a body bolster $b$, the truck members being represented by the truck bolster $d$ which carries roller side bearing $e$. There are of course one of these bearings on each end of the bolster. The air train line pipe is as usual mounted in the car body structure and is indicated at $f$. A short solidly constructed branch pipe $g$—$h$ leads from the air line pipe $f$ laterally to a point slightly beyond the transverse line of the side roller bearing (Fig. 1) and the short length $h$ extends substantially parallel but slightly above the level of the air train line $f$. This branch pipe $h$ is connected to the branch $g$ by a coupling $i$ and an elbow $j$, and the end of the branch carries a comparatively heavy air valve body $k$ having its lower end $l$ forked and made relatively wide (as shown in Fig. 2) to afford a bearing for a pair of fulcrum pins $m$. For the purpose of reinforcing and steadying and imparting permanency to this valve body an angular bracket $o$ secured to the body bolster $b$ has one of its flanges $o^1$ extending forwardly and disposed to bear against the outer side of the valve body where it receives the ends of the fulcrum pins $m$ which are preferably machine bolts with their heads at one side and their opposite ends are threaded through the opposite sides of the fork. Check nuts $q^1$ hold the bolts in place. These nuts are provided with the usual nut-locks, not shown, and when secured in place the bracket $o$ securely anchors the valve body and braces the branch pipes. A valve lever $r$ is carried within the forked lower end of the valve body and is fulcrumed on the pins $m$—$m$, the lever having a pair of slots $s$ concentric to the respective fulcrum pins, and its lower end $t$ extends to a point between the lugs $v$ which I will presently describe. The valve within the valve body consists of a stem 10 having formed integrally therewith a circular bearing block 12 at its lower end for engagement by the valve lever $r$ and at its upper end with a valvular disc 14, and a guiding block 15. An expansile spring 16 bears between the valvular disc and a plug 17 closing the top of the valve body. The valvular disc seats on a valve seat 18.

Usually the roller side bearings $e$ are secured to the top of the opposite ends of the truck bolster by machine screws or rivets $w$ one at the inner side of the bearing and two at the outer side thereof and fastening the bearing to the top of the truck bolster through lugs $x$ formed integrally with the bearing. With this rigid side roller bearing I incorporate the lugs $v$ by forming the latter as an integral part of a maleable iron or cast steel bar $y$ having a pair of horizontally inwardly extending fastening lugs 2 formed integrally with the lugs $v$ which are vertical. These lugs 2 overlay the two lugs $x$ and are secured in place by the pair of rivets $w$, and the bar $y$ and lugs $v$ are further braced by a foot 20 resting on the top of the truck bolster. These vertical lugs $v$ are solidly held and their inherent structure owing to the strengthening webs 3 and 4 are not easily displaced or damaged. In fact their rigidity is such that the fulcrums of the valve lever however rusted or otherwise having its movement retarded can never be sufficient to prevent the lever being turned when derailment takes place and it engages either of the lugs $v$.

The advantage of the lever with its curved slots and its relative width, is that a very slight movement of the lever end $f$ is sufficient to lift the valve 14 and release the air, which then escapes from the train line pipe $f$ through the branches $g$ and $h$ and the valve port 18 and side ports 30 and 31. Any lateral displacement of the truck beyond normal movement, as would be caused by any of the wheels leaving the rails, will cause one or the other lug $v$ to engage the lever end $f$ as shown in Fig. 6, thereby through the cam action of the top of the lever lifting valve 14 and uncovering the port 18. Furthermore this relative position of parts permits of an adjustment which will release the air on a curve of too wide a radius in the track where derailment is a possibility and sometimes occurs.

My derailment brake as is apparent from the foregoing, is not only of simple construction and adapted for direct operation but furthermore is as solid as any other mechanism with which a truck is equipped and is well adapted to withstand any shock and vibration to which the car or train which it serves may be subjected under normal service conditions. And my equipment being mounted in intimate relation with the roller side bearing is well adapted to have the valve controlling lever located in a position directly between the lugs and therefore in effective position without the necessity of any long and consequently frail and unstaple connections between the fixed member on the truck and the valve controlling the air brakes.

What I claim is as follows:

1. In a derailment brake applying device for a railway car, the combination with the truck and the body of the car, the latter having a body bolster and carrying an air brake equipment, and the truck having a bolster; of means located partially on the body of the car and partially on the truck bolster and entirely above the latter and in vertical alignment therewith for setting the brakes when the truck turns to an abnormal extent.

2. A device such as claimed in claim 1 having a member of the air brake equipment located in the vicinity of the body bolster.

3. In a derailment brake applying device for a railway car the combination with the truck and the body of the car, the latter carrying an air brake equipment and the truck having a bolster; of a pair of lugs rigidly mounted on the top of and above the bolster and spaced a distance apart greater than the distance of normal lateral movement of the truck relatively to the body of the car, a valve body in communication with the train line of the air brake equipment and the atmosphere and fixedly mounted on the body of the car in direct vertical line with the space between the lugs, such valve body containing a valve controlling the atmospheric communication, a valve-lever in vertical alignment with and operatively connected to the valve and projecting downwardly to a point between the spaced lugs with its lower end in position for direct engagement thereby upon derailment and consequently abnormal lateral movement of the truck relatively to the body of the car.

4. In a derailment brake applying device, a side roller bearing mounted rigidly on one end of the truck bolster, the base of such side bearing having rigidly secured thereto a bar with vertical lugs at its ends and webs for strengthening the said lugs, and a valve operating mechanism consisting of a valve body mounted rigidly on the truck bolster and connected to the air brake train line, and having its lower end forked and carrying a pair of fulcrum pins, a lever having a pair of slots concentric respectively with the fulcrum pins and engaging the same, such lever being positioned with its lower end between the lugs for engagement thereby upon abnormal lateral movement of the truck relatively to the body of the car.

In testimony whereof I have signed my name to this specification.

EMILE J. M. ST. JACQUES.